United States Patent [19]

Pettijohn

[11] Patent Number: 5,082,882
[45] Date of Patent: Jan. 21, 1992

[54] USE OF STARCH IN THE PREPARATION OF POLYMERS

[75] Inventor: Ted M. Pettijohn, Bartlesville, Okla.

[73] Assignee: Phillips Petroleum Company, Bartlesville, Okla.

[21] Appl. No.: 443,545

[22] Filed: Nov. 30, 1989

[51] Int. Cl.$^5$ .............................. C08L 3/00; C08L 3/02
[52] U.S. Cl. ........................................ 524/47; 524/48; 524/734; 527/313
[58] Field of Search ............................ 524/47, 48, 734; 527/313

[56] References Cited

U.S. PATENT DOCUMENTS 3,704,271  11/1972  Prahl et al. ............................ 524/734
4,431,788   2/1984  Kaminsky ............................ 527/313

FOREIGN PATENT DOCUMENTS 1487050  9/1977  United Kingdom .

OTHER PUBLICATIONS

Plastics Engineering, W. J. Maddever and G. M. Chapman, Jul. 1989, pp. 31-34.
Plastics World, D. Erickson, May 1989, pp. 61 and 63.

Primary Examiner—Nathan M. Nutter
Attorney, Agent, or Firm—Edward L. Bowman

[57] ABSTRACT

A process is disclosed for preparing a polymer/starch composite. The process involves forming the polymer in the presence of starch, an organometallic cocatalyst, and a particulate olefin polymerization catalyst. Also there is disclosed a process for improving the activity of a particulate olefin polymerization catalyst by the employment of a suitable amount of starch during the polymerization.

23 Claims, No Drawings

USE OF STARCH IN THE PREPARATION OF POLYMERS

FIELD OF THE INVENTION

The present invention relates to polyolefins. In another aspect the invention relates to polyolefins containing starch. In still yet another aspect the present invention relates to catalyst systems for the polymerization of olefins.

BACKGROUND OF THE INVENTION

In view of the large number of products that are now being produced from polymers, there has developed an interest in producing some polymers that can be easily disintegrated or degraded to aid in the waste disposal of the products.

One approach that has been taken in the past has been the formation of polymer/starch composites. The presence of starch in the composites makes the products biodegradable, i.e. the products disintegrate into less bulky materials more readily due to the action of living organisms such as bacteria and fungi upon the starch.

One method which has been used in the past to make such polymer/starch composites has been the blending of the starch with molten polymer, for example in an extruder or mixer. This technique in many cases involves first pretreating the starch to make it more compatible with the polymer. In some cases a prodegradant such as an organometallic compound is also added to the polymer. As the starch is biodegraded the article prepared from such a polymer loses its physical integrity. The article simply falls apart leaving material that is less bulky. When a prodegradant is employed, oxidation of the remaining polymer can result in additional disintegration. The preparation of such polymer/starch composites by blending is difficult and has often been found to be destructive to both the equipment employed and the polymer properties.

Another technique of preparing polymer/starch composites has involved gelling the starch in water and mixing the resulting product with molten polyolefin. This technique often results in a more homogeneous mixture but can result in composites having less than desirable physical properties.

Still another technique that has been proposed for preparing polymer/starch composites involves actually forming the polymer in the presence of starch using soluble transition metal catalysts. Such techniques are disclosed in U.S. Pat. No. 3,704,271 and U.S. Pat. No. 4,431,788. One of the drawbacks of such processes is that the starch has an adverse effect upon the activity of catalysts of the type disclosed in those patents. As a result, it will be noted that the polymer/starch composites disclosed in those two patents do not contain large amounts of polymer. For example, those two patents do not indicate that such processes would be capable of producing polymer/starch composites which contain at least about 80 wt. % or more of polymer.

Since the polymer/starch composites of those two aforementioned patents have relatively large amounts of starch there is obviously a limitation on the extent to which the desirable properties of the polyolefin can be carried forward into the composite. An object of the present invention is to provide a method in which a polymer/starch composite can be prepared which contains a more substantial amount of polymer.

Another object of the present invention is to provide a method for promoting the activity of certain highly active particulate olefin polymerization catalysts.

SUMMARY OF THE INVENTION

In accordance with the present invention, a process is provided for preparing a polymer/starch composite comprising polymerizing at least one olefin under suitable polymerization conditions in the presence of (a) particles of starch, (b) an organometallic cocatalyst, and (c) a particulate olefin polymerization catalyst comprising a transition metal.

Another aspect of the present invention involves the discovery that small amounts of starch can actually improve the activity of a highly active particulate olefin polymerization catalyst.

DETAILED DESCRIPTION OF THE INVENTION

Starch is a naturally occurring polymer isolated from corn, lignin, potato, rice, etc. and is made of repeating amylose units. Each amylose unit contains 3-OH groups. Starch has been referred to as a high polymeric carbohydrate composed of $\alpha$-glucopyanose units joined together by $\alpha$-1,4-glyscosidic linkages. A further description of starch is provided in the publication entitled "Starch" by Whistlier and Paschall, Vols. I and II (1965 and 1967) which is incorporated herein by reference. The term "starches" as used herein is intended to include all types of starches as well as chemically and/or physically modified starches and starch degradation products such as starch hydrolyzates including starch saccharification products. Granular serial starches, especially cornstarch, or root or tuber starches, especially potato starch, or modified degraded starches are generally preferred. The terms "modified starch" and "starch degradation products" include for example pregellatinized starches (cold swelling starch), acid modified starches, oxidized starches, slightly crosslinked starches, starch ethers, starch esters, dialdehyde starches, and degradation products of starch hydrolyzed products and dexatrenes.

If a starch contains an excess amount of water it has been found that the water can totally poison the transition metal containing catalyst. Accordingly it is generally preferred that the starch be dried to a sufficient level of moisture content. Typically this would involve drying the starch so it has a water content of less than 7 wt. % and more preferably less than about 1 wt. %. The size of the starch particles can vary widely. Large and small particles can be employed depending on the type of starch employed, the desired results, and the ultimate use. In general, it is desirable to employ small discrete particles of starch, for example particles of from about 0.05 to about 100 microns, more preferably about 1 to 50 microns and still more preferably about 1.5 to 25 microns.

The present invention is considered applicable to any particulate solid olefin polymerization catalysts comprising a transition metal. Typical such transition metal catalysts are solids containing Group IVB through VIII metals, e.g. titanium, zirconium, hafnium, thorium, vanadium, niobium, tantalum, chromium, molybdenum, tungsten, manganese, and iron. The currently most preferred catalysts for polymerizing the olefins in accordance with the present invention are those which contain titanium, vanadium, or mixtures thereof. Some of the more specific particulate high activity olefin polymerization catalysts which are useful in the present invention include those disclosed in U.S. Pat. Nos. 4,363,746; 4,325,837; 4,326,988; 4,397,763; 4,394,291; 4,477,588; 4,555,496; 4,562,168; 4,107,414; 4,391,736; 4,384,982; and 4,514,514, the disclosures of which are incorporated herein by reference.

The organometallic cocatalysts suitable for use in accordance with the present invention are selected from organometallic compounds in which the metal is selected from the metals of Groups I to III of the Periodic Table. Some typical examples include lithium alkyls, Grignard reagents, dialkyl magnesium compounds, dialkyl zinc compounds, and organoaluminum compounds. Some typical organoaluminum compounds include hydrocarbylaluminum hydrides, trihydrocarbylaluminum, dihydrocarbylaluminum monohalides, monohydrocarbylaluminum dihalides, and hydrocarbylaluminum sesquihalides. Some preferred organoaluminum compounds can be represented by the formulas $R_3Al$, $R_2AlX$, $RAlX_2$, and $R_3Al_2X_3$, respectively, wherein each R is individually selected from hydrocarbyl radicals containing from 1 to about 20 carbon atoms per radical and can be the same or different and each X is a halogen atom and can be the same or different. Some specific examples of such organoaluminum compounds include trimethylaluminum, triethylaluminum, triisopropylaluminum, tridecylaluminum, trieicosylaluminum, tricyclohexylaluminum, tri-phenylaluminum, 2-methylpentyldiethylaluminum, triisoprenylaluminum, methylaluminum dibromide, ethylaluminum dichloride, ethylaluminum diiodide, isobutylaluminum dichloride, ethylaluminum diiodide, isobutylaluminum dichloride, dodecylaluminum dibromide, dimethylaluminum bromide, methyl-N-propylaluminum bromide, diphenylaluminum chloride, dicyclohexylaluminum bromide, methylaluminum sesquibromide, ethylaluminum sesquichloride, and the like. The currently preferred cocatalysts for use with titanium-containing catalysts are the hydrocarbyl aluminum compounds such as triethylaluminum or trimethylaluminum.

In order to obtain maximum catalyst activity it is preferred that the organoaluminum compound be present when the particulate catalyst is first brought into contact with the starch. Accordingly it is within the scope of the present invention to combine the starch and the cocatalyst and then combine that mixture with the catalyst. Alternatively it is within the scope of the present invention to combine the catalyst and cocatalyst and then combine that mixture with the starch. Generally the catalyst, cocatalyst, and starch are combined together in a suitable diluent. Diluents of the type generally used in the past with such particulate polymerization catalysts are considered to be suitable. Examples include substantially dry hydrocarbons, such as isobutane, heptane, hexane, pentane, methylcyclohexane, toluene, xylene, and the like.

The polymerizable olefins which can be employed in this process include any of those which can be polymerized with the particulate catalyst of the type specified. Mono-1-olefins having 2 to 12 carbon atoms per molecule are generally most preferred. Such mono-1-olefins can be copolymerized with other olefins and/or with other smaller amounts of other ethylenically unsaturated monomers, such as 1,3-butadiene, isoprene, 1,3-pentadiene, styrene, α-methylstyrene, and similar ethylenically unsaturated monomers which do not impare the catalyst.

The amount of starch, catalyst, and cocatalyst employed can vary over a wide range depending upon the particular results desired. In preparing polymers which can be viewed as being particularly biodegradable it is generally preferred to use starch in an amount sufficient to insure that the resulting polymer/starch composite will contain about 1 to about 40 wt. % starch. A currently more preferred range is about 3 to about 15 wt. % starch. For the amounts of catalyst and cocatalyst to be employed reference can be made to the amounts that have been used in the past when such catalysts were used for polymerizing olefins in the absence of starch. Particularly good results have been obtained using triethylaluminum cocatalyst in combination with a catalyst of the type disclosed in U.S. Pat. No. 4,326,988 or U.S. Pat. No. 4,325,837, typically the molar ratio of the triethylaluminum cocatalyst to Ti is in the range of about 10/1 to about 350/1. The ratio of starch to titanium can vary widely. Typically the molar ratio of starch to titanium would be in the range of about 111 to about 40,000/1 or higher.

One of the features of the present invention is that, at lower levels the starch molecule has been found to actually promote the activity of the particulate catalyst. Further, if the amount of starch employed is such that it has an adverse effect upon the productivity of the catalyst it has been found that one can counteract that affect by further increasing the amount of cocatalyst employed.

The polymer/starch composite produced in accordance with this invention can have a variety of uses depending upon the physical properties of the particular composite. The composite containing at least about 80 percent polymer, especially when the polymer is a polyolefin such as polyethylene or polypropylene, will generally be useful in preparing articles such as trash bags, shopping bags, 6-pack rings, and various types of bottles, containers, and wrappers.

A further understanding of the present invention, its objects, and advantages will be provided by the following examples. In the examples unless indicated otherwise the starch was dried in vacuum at 110° C. until a moisture analysis of approximately 0.5% by weight was obtained.

EXAMPLE I

A series of runs were conducted to determine the effect of the starch on the polymerization of ethylene with a catalyst sold by Catalyst Resources, Inc. which was prepared by a process of the general type disclosed in U.S. Pat. Nos. 4,363,746; 4,325,837; and 4,326,988 and contained about 12 wt. % titanium. The catalyst is one which is prepared by forming a solution of titanium tetraethoxide and magnesium chloride and then precipitating a solid from that solution by the addition of ethylaluminum sesquichloride under conditions such that prepolymer is deposited upon the solid. The resulting solid is then contacted with titanium tetrachloride. Such catalysts generally contain about 1 to about 30 weight percent prepolymer, more typically about 4 to about 10 weight percent prepolymer. A 15 wt. % solution of triethylaluminum in heptane was used as the cocatalyst. The hydrocarbon solvents employed were degassed and dried over activated alumina or molecular sieves before use. The catalyst and the starch were each individually slurried in cyclohexane so that they could be transferred using a syringe or through a valve and needle assembly. Ultrasound was used to ensure that the slurries remained uniform. The polymerization reactions were conducted in a 1-gallon stirred autoclave. The catalyst, cocatalyst, and starch were charged to a dry reactor under counterflow of ethylene at ambient temperature. In this example the catalyst and cocatalyst were brought into contact with each other before the catalyst was brought into contact with the starch. The reactor was sealed and ethylene flow was stopped. Isobutane was then added as reaction solvent. The reactor temperature was then increased to 90° C. at which time hydrogen was added to provide a partial pressure of 47 psig. Ethylene was added to provide a partial pressure of 200 psig. The reaction temperature and ethylene pressure were maintained for 1 hour. After that the solvent was removed and the polymer was collected as a dry fluff. The polymerization variables and the results obtained are shown in Table I.

ible. Thus, while run 6 gives a productivity of only 11,000 grams of polyethylene per gram of catalyst per hour at a starch to titanium molar ratio of 4,000, by increasing the triethylaluminum the productivity can be raised again. By increasing the triethylaluminum from 1.7 to 2.8 to $3.9 \times 10^{-3}$M, the productivity improved from 11,000 to 20,000 to 33,000 grams of polyethylene per gram of catalyst per hour, respectively. In Runs 1–6 the molar ratio of aluminum/titanium, i.e. the gram atom ratio, was about 132/1. In Runs 7 and 8 the molar ratio of aluminum to titanium was about 220/1 and 307/1, respectively. It is believed that the starch and the catalyst solids are heterogeneously dispersed in the liquid medium whereas the triethylaluminum is in solution and is free to interact with either solid.

Run 8 demonstrates that it is possible to obtain high yields of polymer while at the same time producing a

TABLE I

The effect of starch on the polymerization of ethylene.[a]

| Run | Et$_3$Al Conc. | Starch | Activity g PE/g XPF/h | Starch/Ti[b] | % Starch[c] | MI | HLMI | Density | GPC Analysis[d] M$_w$ | M$_n$ | HI |
|---|---|---|---|---|---|---|---|---|---|---|---|
| 1 | $1.7 \times 10^{-3}$ M | 0 g | 25,000 | 0 | 0 | 0.60 | 21.2 | 0.9607 | 150 | 29.7 | 5.1 |
| 2 | $1.7 \times 10^{-3}$ M | 1 g | 27,000 | 250 | 0.4 | 0.56 | 18.0 | 0.9617 | 146 | 28.6 | 5.1 |
| 3 | $1.7 \times 10^{-3}$ M | 2 g | 30,000 | 500 | 0.7 | 0.47 | 14.9 | 0.9625 | 165 | 24.2 | 6.8 |
| 4 | $1.7 \times 10^{-3}$ M | 4 g | 30,000 | 1,000 | 1.3 | 0.27 | 9.4 | 0.9638 | 186 | 36.0 | 5.2 |
| 5 | $1.7 \times 10^{-3}$ M | 8 g | 24,000 | 2,000 | 3.3 | 0.39 | 14.1 | 0.9732 | 181 | 33.5 | 5.4 |
| 6 | $1.7 \times 10^{-3}$ M | 16 g | 11,000 | 4,000 | 12.6 | 0.17 | 5.4 | e | 206 | 30.6 | 6.7 |
| 7 | $2.8 \times 10^{-3}$ M | 16 g | 20,000 | 4,000 | 7.5 | 0.36 | 10.8 | e | — | — | — |
| 8 | $3.9 \times 10^{-3}$ M | 16 g | 33,000 | 4,000 | 4.6 | 0.56 | 17.8 | 0.9771 | 147 | 23.2 | 6.3 |

[a]Conditions: 1-gal Autoclave reactor; iso-butane solvent (2 L); 1 hr; XPF catalyst (10 mg); ΔP(H$_2$) = 47 psig); ΔP(C$_2$H$_4$) = 200 psig.
[b]Mole ratio based on the formula weight of starch.
[c]Weight percent starch in product.
[d]M$_w$ = weight ave. mol. wt./10$^3$; M$_n$ = number ave. mol. wt./10$^3$; HI = heterogeneity index (M$_w$/M$_n$).
[e]Between 0.99 and 1.13 g/mL.

The data in Table I illustrates that at lower levels the presence of the starch actually improves the activity of the Catalyst Resources, Inc. catalyst. When no starch was added to the reactor, the productivity of the catalyst was 25,000 grams of polyethylene per gram of catalyst per hour. The addition of 1 gram of dried starch, i.e. a starch/titanium molar ratio of 250, caused the productivity to increase to 27,000 grams of polyethylene per gram of catalyst per hour. The productivity further increased to 30,000 grams of polyethylene per gram of catalyst per hour for starch to titanium molar ratios of 500 and 1,000. The data reveals that once the starch to titanium ratio has been raised to about 2,000 the catalyst is no more active than when no starch was employed in a combination with a catalyst. The fact that the starch actually increases the activity of the catalyst is particularly surprising since each amylose group of the starch contains 3-OH groups would have been expected to poison the catalyst.

The loss in productivity observed at high starch to titanium mole ratios is shown by the table to be reversible composite containing more than enough starch to be considered biodegradable.

EXAMPLE II

This example is set forth to demonstrate the effects of charge order, starch content, moisture content in the starch, and comonomer on the polymerization. The catalyst and cocatalyst were the same as set forth in Example I. Runs 1–3 are the same as in Example I. In this example the phrase [Al/XPF] is intended to denote that the cocatalyst and the catalyst were combined together prior to contact with the starch. The phrase [Al/St] is intended to indicate that the cocatalyst and the starch were combined together before being contacted with the catalyst. Finally the phrase [XPF/St] is intended to indicate that the catalyst was combined with the starch prior to being combined with the cocatalyst.

The polymerizations were carried out using the same general conditions that were used in Example I.

TABLE II

The effects of charge order, starch, moisture content in starch, and comonomer on the starch induced increase in catalyst productivity.[a]

| Run | Charge Order[b] | Starch | % H$_2$O | Hexene | Activity g PE/g XPF/h | MI | HLMI | Density | GPC Analysis[c] M$_w$ | M$_n$ | HI |
|---|---|---|---|---|---|---|---|---|---|---|---|
| 1 | Al/XPF | 0 g | — | — | 25,000 | 0.60 | 21.2 | 0.9607 | 150 | 29.7 | 5.1 |
| 2 | [Al/XPF]St | 1 g (potato) | 0.50 | — | 27,000 | 0.56 | 18.0 | 0.9617 | 146 | 28.6 | 5.1 |
| 3 | [Al/XPF]St | 2 g (potato) | 0.50 | — | 30,000 | 0.47 | 14.9 | 0.9625 | 165 | 24.2 | 6.8 |
| 9 | [Al/St]XPF | 1 g (potato) | 0.50 | — | 28,000 | 0.54 | 18.8 | 0.9615 | 154 | 29.7 | 5.2 |
| 10 | [Al/St]XPF | 2 g (potato) | 0.50 | — | 30,000 | 0.48 | 14.7 | 0.9624 | 160 | 29.3 | 5.4 |
| 11 | Al[XPF/St] | 2 g (potato) | 0.50 | — | 6,600 | 0.29 | 10.3 | 0.9732 | 178 | 30.7 | 5.8 |
| 12 | [Al/XPF]St | 2 g (potato) | 9.48 | — | 0 | — | — | — | — | — | — |
| 13 | [Al/XPF]St | 2 g (corn) | 0.50 | — | 30,000 | 0.38 | 12.7 | 0.9623 | 161 | 29.4 | 5.5 |
| 14 | Al/XPF | 0 g | — | 90 g | 25,000 | 1.32 | 35.1 | 0.9501 | 117 | 26.9 | 4.3 |

TABLE II-continued

The effects of charge order, starch, moisture content in starch, and comonomer on the starch induced increase in catalyst productivity.[a]

| Run | Charge Order[b] | Starch | % H$_2$O | Hexene | Activity g PE/g XPF/h | MI | HLMI | Density | GPC Analysis[c] M$_w$ | M$_n$ | HI |
|---|---|---|---|---|---|---|---|---|---|---|---|
| 15 | [Al/XPF]St | 2 g (potato) | 0.50 | 90 g | 28,000 | 2.00 | 53.1 | 0.9542 | 105 | 20.7 | 5.1 |

[a]Conditions: 1-gal Autoclave reactor; iso-butane solvent (2 L); 90° C.; 1 hr; XPF catalyst (10 mg); 1.7 × 10$^{-3}$ M [Et$_3$Al]; ΔP(H$_2$) = 47 psig; ΔP(C$_2$H$_4$) = 200 psig.
[b]Al = Et$_3$Al; St = starch; [ ] = reaction prior to reactor charge.
[c]M$_w$ = weight ave. mol. wt./10$^3$; M$_n$ = number ave. mol. wt./10$^3$; HI = heterogeneity index (M$_w$/M$_n$).

The data in Table II shows that the order in which the three components, i.e. starch, catalyst, and cocatalyst, are added is important. When they are charged in the order of cocatalyst then starch then catalyst or in the order of cocatalyst then catalyst then starch good productivity was observed. If the catalyst and the starch were mixed prior to the addition of the cocatalyst, a drastic reduction in activity was observed. It is believed that this may possibly be due to the water associated with the starch even though the amount of water is very low. It is considered that the cocatalyst in some way possibly acts as a scavenger for the water in the system. Run 12 shows that if the starch is not pre-dried it completely poisons the catalyst. A comparison of Runs 10 and 13 shows that there is no detectable difference in productivity or polymer properties resulting from substituting dried cornstarch for dried potato starch. A comparison of Runs 14 and 15 shows that the addition of a comonomer into the polymerization also had no effect on the observed increase in activity which is provided by the starch.

EXAMPLE III

Polymer/starch composites were prepared by using dry soluble starch and virgin polyethylene fluff by mixing in a Brabender Plasti-corder mixer. The mixtures were made under nitrogen at 150° C. using a residence time of 30 minutes. The polymer/starch resins produced by blending were hot pressed into films. Similar films were prepared by hot pressing the polymer/starch composites which were produced by polymerizing ethylene in the presence of the starch in accordance with the present invention.

Both types of films were dipped into aqueous iodine solution so that the surface active starch particles could be readily observed and micrographs were taken. The film prepared from the polymer/starch composites prepared by polymerization compare quite well visually with films prepared from the polymer/starch prepared by physically blending. The starch granules in both are homogeneously dispersed throughout the film matrix. The availability of the starch at the surface of the composites prepared by polymerization indicates that the process does not deny access to the starch by encapsulation.

Since the density of starch is approximately 1.3 grams/milliliter, the density of the polymer/starch blends should generally increase with increasing starch content. The data in Tables I and II indicate that such is observed. The densities of the polymer/starch composites prepared by polymerization and by physically blending are quite comparable. For instance the densities of resins containing 3.3% starch prepared by the two techniques were 0.9732 and 0.9729 grams/milliliters respectively.

EXAMPLE IV

A few additional runs were made attempting to prepare polymer/starch composites but with liquid transition metal compounds rather than the particulate transition metal catalyst required by the present invention.

In these runs the transition metal compound catalyst was combined with a toluene solution of starch and trialkylaluminum cocatalyst. In one case the starch cocatalyst solution was prepared using triethylaluminum (TEA) as the cocatalyst. That solution was about 1.1 molar aluminum. The other starch/cocatalyst solution was prepared using trimethylaluminum (TMA) as the cocatalyst and the solution was about 1.2M aluminum.

In one of the polymerizations 5 milliliters of the starch/TMA solution, i.e. about 5.5 millimoles aluminum was combined with about 0.5 milliliters of a 0.01M toluene solution of cyclopentadienylzirconium dichloride, i.e. about 0.05 millimole zirconium. The polymerization was conducted at 50° C. and 550 psig ethylene for about 1 hour. About 2.86 grams of white polymer was recovered. This translated into a productivity of about 7,800 grams of polymer/gram Zr/hour.

In another polymerization about 5 milliliters of the starch/TEA solution, i.e. about 6 millimole of aluminum, was combined with about 1 milliliter of a 0.01M cyclohexane solution of titanium tetrachloride, i.e. about 0.01 millimole titanium. Again the polymerization was conducted at about 50° C. and 550 psig ethylene for about 1 hour. About 5.81 grams of white polymer was recovered. This translated into a productivity of about 13,000 grams of polymer/gram titanium/hour.

In still another polymerization 5 milliliters of the starch/TEA solution, i.e. about 6 millimoles of aluminum, was combined with 9 milliliters of the 0.01M cyclohexane/titanium tetrachloride solution, i.e. about 0.09 millimoles titanium. The polymerization was again conducted at about 50° C. and 550 psig ethylene. About 19.9 grams of white polymer was recovered. This translates into a productivity of about 4,700 grams of polymer per gram titanium per hour.

In contrast to these productivities of about 5,000 to 13,000 grams of polymer/gram transition metal/hour, the inventive Runs 2-8 of Example I show productivities in the range of about 93,000 to about 300,000 grams polymer/gram transition metal/hour. This demonstrates that the present invention is capable of giving polymer/starch composites having much lower transition metal content than the polymer/starch composites prepared using the liquid transition metal compounds.

While the present invention has now been described in general terms and some specific examples have been given to illustrate the invention, it should be recognized that there are many variations and modifications can be made without departing from the spirit and scope of this invention.

That which is claimed is:

1. A process for preparing a polymer-starch composite containing at least about 80 weight percent polymer comprising polymerizing at least one olefin under suitable polymerization conditions in the presence of particles of starch, an organometallic co-catalyst, and a particulate olefin polymerization catalyst comprising magnesium and a transition metal.

2. A process according to claim 1 wherein said organometallic co-catalyst is selected from organoaluminum compounds in which the organo radicals are hydrocarbyl radicals containing 1 to 20 carbon atoms.

3. A process according to claim 2 wherein said organoaluminum cocatalyst is selected from trialkylaluminum compounds in which each alkyl group has 1 to 4 carbon atoms.

4. A process according to claim 3 wherein said particulate olefin polymerization catalyst is prepared by a process involving forming a solution from titanium tetraethoxide and magnesium dichloride, reacting said solution with an organoaluminum halide to obtain a precipitate, and contacting the resulting precipitate with titanium tetrachloride to increase the activity of said resulting precipitate.

5. A process according to claim 4 wherein said solution is reacted with ethylaluminum sesquichloride to obtain said precipitate.

6. A process according to claim 5 wherein said particulate olefin polymerization catalyst contains about 1 to about 30 weight percent polyethylene prepolymer.

7. A process according to claim 6 wherein said cocatalyst is triethylaluminum.

8. A process according to claim 7 wherein the molar ratio of starch to titanium is such that the catalyst is more active than if the starch were not employed under identical conditions.

9. A process according to claim 8 wherein the molar ratio of starch to titanium is in the range of about 250/1 to about 4,000/1.

10. A process according to claim 9 wherein the molar ratio of starch to titanium is in the range of about 250/1 to about 2,000/1.

11. A process according to claim 10 wherein the molar ratio of the cocatalyst to titanium in the catalyst is in the range of about 10/1 to about 350/1.

12. A process according to claim 11 producing a polymer containing 1 to 20 wt. % starch.

13. A process according to claim 12 wherein said polymer consists essentially of polyethylene.

14. A process according to claim 1 producing a polymer containing 1 to 20 wt. % starch.

15. A process according to claim 14 wherein said olefin that is polymerized consists essentially of ethylene.

16. A starch-containing polymer produced according to the process of claim 15.

17. A film produced from a polymer comprising the starch-containing polymer of claim 16.

18. A film according to claim 17 containing at least about 80 wt. % polyethylene.

19. A molded container produced from a polymer comprising the starch-containing polymer of claim 16.

20. A process for improving the activity of a catalyst system comprising a particulate catalyst comprising magnesium and a transition metal and a co-catalyst comprising an organometallic compound, said process comprising contacting said catalyst with said co-catalyst and an activity promoting amount of starch, wherein the co-catalyst is either (1) combined with the catalyst and then the resulting mixture is combined with the starch or (2) the starch and the co-catalyst are combined and that resulting mixture is combined with the catalyst.

21. A process according to claim 20 wherein said catalyst is prepared by a process involving forming a solution from titanium tetraethoxide and magnesium dichloride, reacting said solution with an organoaluminum halide to obtain a precipitate, and contacting the resulting precipitate with titanium tetrachloride to increase the activity of said catalyst.

22. A process according to claim 21 wherein said cocatalyst is a trialkylaluminum compound.

23. A process according to claim 22 wherein said cocatalyst is triethylaluminum.

* * * * *